United States Patent [19]

Yoshimura et al.

[11] Patent Number: 4,464,484

[45] Date of Patent: Aug. 7, 1984

[54] PROCESS FOR PRODUCING PREFOAMED POLYMER PARTICLES

[75] Inventors: Shohei Yoshimura, Tomioka; Hideki Kuwabara, Hatano, both of Japan

[73] Assignee: Japan Styrene Paper Corporation, Tokyo, Japan

[21] Appl. No.: 561,095

[22] Filed: Dec. 13, 1983

[30] Foreign Application Priority Data

Dec. 20, 1982 [JP] Japan .............................. 57-221936
Jan. 7, 1983 [JP] Japan .................................. 58-976
May 4, 1983 [JP] Japan ................................ 58-78668

[51] Int. Cl.$^3$ .............................................. C08J 9/22
[52] U.S. Cl. ...................................... 521/58; 264/50; 264/53; 264/DIG. 9; 264/DIG. 15; 521/56; 521/60
[58] Field of Search ............... 521/56, 60, 58; 264/53, 264/50, DIG. 9, DIG. 15

[56] References Cited

U.S. PATENT DOCUMENTS 2,864,778 12/1958 Mladinich .............................. 521/82
3,725,320 4/1973 Wang ........................... 264/DIG. 15

*Primary Examiner*—Morton Foelak
*Attorney, Agent, or Firm*—Sherman & Shalloway

[57] ABSTRACT

Prefoamed polymer particles having excellent moldability are produced by a process comprising a step (impregnating step) of impregnating carbon dioxide or carbon dioxide and a volatile blowing agent in polymer particles, a step (dispersing step) of dispersing the polymer particles into a dispersion medium in a sealed vessel, a step (heating step) of heating the polymer particles to a temperature higher than the softening point of said polymer particles, and a step (releasing step) of opening one end of said vessel and simultaneously releasing the polymer particles and dispersion medium from inside the vessel to an atmosphere held at a pressure lower than that of the vessel. In this process, the impregnating step, dispersing step and heating step need not be altogether effected separately. These steps can be performed simultaneously in one and the same vessel.

10 Claims, No Drawings

PROCESS FOR PRODUCING PREFOAMED POLYMER PARTICLES

This invention pertains to a process for producing a prefoamed polymer particles. More specifically, this invention pertains to a process for producing prefoamed polymer particles, characterized by using carbon dioxide as a blowing agent.

In producing synthetic resin foams, a so-called bead molding method wherein prefoamed particles are filled in a mold, heated and expanded has been to date carried out. Such prefoamed particles are, as described in Japanese Patent Publication No. 1344/81, prepared by dispersing polymer particles containing a volatile blowing agent into water in a sealed vessel, heating the particles to a temperature higher than the softening point of said polymer while keeping the pressure of the inside of said vessel above the vapor pressure of the blowing agent, then opening one end under the water level of the vessel and simultaneously releating the polymer particles and water from the vessel to an atmosphere held at a pressure lower than that of the vessel. Examples of the volatile blowing agent include propane, butane, heptane, hexane, cyclobutane, cyclopentane, trichlorofluoromethane and dichlorodifluoromethane.

However, there have been problems that these volatile blowing agents swell the polymer particles, the range of the temperature suited for expansion at the time of prefoaming is narrow, the expansion temperature has a great influence on the expansion ratio and the expansion ratio is hard to control. Moreover, some of these volatile blowing agents are dangerous because they are toxic or burnable, and some are less dangerous but costly and have a problem of environmental pollution to destroy an ozone layer.

Anyway, though the abovedescribed volatile blowing agents have various problems, effective blowing agents to replace them have not existed and they have been still used accordingly.

An object of this invention is to provide a process for producing prefoamed polymer particles free from such drawbacks as seen in the above conventional technique.

The present inventors have made extensive studies to achieve the above object. As a consequence, it has been found that by using singly or in combination with other known volatile blowing agents carbon dioxide which no attention has been so far attracted to as a blowing agent, the safety of the process increases, the environmental pollution is prevented, the range of temperature suited for expansion at the time of prefoaming is extended, the prefoaming operation can be preformed easily with safe, and prefoamed particles having a high proportion of closed cells and excellent moldability are obtainable at low cost.

This invention is to provide a process for producing prefoamed polymer particles, which comprises a step (impregnating step) of impregnating carbon dioxide or carbon dioxide and a volatile blowing agent in polymer particles, a step (dispersing step) of dispersing the polymer particles into a dispersion medium in a sealed vessel, a step (heating step) of heating the polymer particles to a temperature higher than the softening point of said polymer particles, and a step (releasing step) of opening one end of said vessel and simultaneously releasing the polymer particles and dispersion medium from inside the vessel to an atmosphere held at a pressure lower than that of the vessel.

Typical examples of materials of the polymer particles used in this invention include polyethylene resins such as a low-density polyethylene, high-density polyethylene, linear low-density polyethylene and ethylene-vinyl acetate copolymer; polypropylene resins such as a propylene homopolymer, ethylene-propylene random copolymer and ethylene-propylene block copolymer; and polyesters such as an aromatic polyester/polyether glycol block copolymer. Polymers such as polystyrene, polyvinyl chloride, thermoplastic polyurethane and polyamide elastomer are also available other than the aforesaid polymers. Of these polymers, the polyolefin resins, such as polyethylene resins and polypropylene resins, are preferable. These polymers may be either crosslinked or non-crosslinked.

The process of this invention include, as mentioned above, a first embodiment of using carbon dioxide singly as a blowing agent and a second embodiment of using carbon dioxide and a volatile blowing agent in combination as blowing agents.

In the first embodiment of this invention, the step (impregnating step) of impregnating carbon dioxide in polymer particles can be performed before, simultaneously with, or after, the dispersing step and/or the heating step. However, these three steps are usually carried out at the same time in one and the same vessel. For example, when the impregnating and dispersing steps are conducted simultaneously in one and the same vessel, carbon dioxide is once dissolved or dispersed in a dispersion medium and then comes to be impregnated in the polymer particles. Carbon dioxide may be used in the form of a gas, liquid or solid (dry ice). The amount of carbon dioxide is usually 5 to 50 parts by weight per 100 parts by weight of the polymer particles.

So far as the objects of this invention is not hindered, it is also possible to impregnate carbon dioxide in the polymer particles in the presence of volatile impregnating aids. The presence of the volatile impregnating aids contributes to increasing a rate at which to impregnate carbon dioxide in polymer particles. Examples of the volatile impregnating aids are compounds having an ability to plasticize the polymer particles, such as acetone, toluene, xylene, heptane, ethyl ether, dioxane, methyl acetate, ethyl acetate, tetrahydrofuran, styrene monomer, isoprene oligomer and dipentene. The amount of these volatile impregnating aids is usually 30 mol% or less based on the total number of moles of carbon dioxide and volatile impregnating aids. The volatile impregnating aids are not limited to the compounds exemplified above. Any compounds able to plasticize the polymer particles in the impregnating step will do. A compound having a preferable ability to plasticize can be properly selected from these compounds depending on the type of the polymer particles.

In the step (heating step) of heating the polymer particles to a temperature above the softening point of said polymer particles, a desirous heating temperature in the crystalline polymers is usually in the range of from a temperature 10° C. lower than the melting point of said polymers to a temperature 50° C. higher than the melting point of said polymers, and that in the amorphous polymers is in the range of from a temperature 10° C. higher than the softening point of said polymers to a temperature 70° C. higher than the softening point of said polymers.

In this invention, the softening point of the polymer is a value found with a load of 4.6 kg/mm$^2$ in accordance with ASTM D648, and the melting point of the polymer is a value found in accordance with a differential scanning calorimeter (DSC). The melting point is measured in such a manner that the temperature of the sample is raised to 200°–300° C. in an atmosphere of nitrogen at a rate of 10° C./min, then lowered to 50° C. at a rate of 10° C./min and again raised at a rate of 10° C./min. The melting point is a temperature of the peak of melting at that time. Where there are plural peaks, the melting point is an average of the plural points.

In the step (dispersing step) of dispersing the polymer particles into the dispersion medium, a dispersant is used to prevent melt-adhesion of polymer particles. Examples of the dispersant include finely divided aluminum oxide, titanium oxide, basic magnesium carbonate, basic zinc carbonate and calcium carbonate. The amount of the dispersant is usually 0.01 to 10 parts by weight per 100 parts by weight of the polymer particles. Examples of the dispersion medium include water, ethylene glycol, glycerol, methanol and ethanol. Water is usually preferred.

As mentioned above, it is not altogether necessary to separately conduct the above impregnating, dispersing and heating steps. These steps can be simultaneously carried out in one and the same vessel, which is rather preferred.

In the step (releasing step) of opening one end of the vessel and releasing the polymer particles and dispersion medium from inside the vessel to an atmosphere held at a pressure lower than that of the vessel, the pressure of the inside of said vessel is usually 20 to 100 kg/cm$^2$ and the low pressure of the atmosphere is usually atmospheric pressure.

In the case of the first embodiment of this invention, prefoaming is conducted with carbon dioxide as a blowing agent as explained above, with a consequence that the range of the temperature suited for expansion at the time of prefoaming is broad and prefoamed particles having a high proportion of closed cells are stably obtainable. Moreover, carbon dioxide is unburnable and less toxic so that it has excellent safety, not allowing destruction of an ozone layer, without fear of an environmental pollution. Besides, it is extremely inexpensive. In particular, when carbon dioxide is impregnated in polymer particles in the presence of the volatile impregnating aid, a ratio at which to impregnate carbon dioxide in polymer particles can increase and prefoamed polymer particles having a high expansion ratio are readily obtainable as a result.

In the second embodiment of this invention, carbon dioxide and the volatile blowing agent are conjointly used as blowing agents to be impregnated in the polymer particles. Carbon dioxide and the volatile blowing agent may be mixed and then impregnated in the polymer particles, or carbon dioxide and the volatile blowing agent be impregnated separately in the polymer particles.

Examples of the volatile blowing agent include aliphatic hydrocarbons such as propane, n-butane, i-butane, butylene, i-butene, pentane, neopentane and hexane; halogenated aliphatic hydrocarbons such as monochloromethane, monochloroethane, dichlorofluoromethane, dichlorodifluoromethane, trifluoromethane and trichlorotrifluoroethane; and alicyclic hydrocarbons such as cyclopentane and cyclohexane. These compounds are used either singly or as a mixture of two or more.

As for the proportions of carbon dioxide and the volatile blowing agent, it is preferred that the volatile blowing agent is 20 to 800 parts by weight, especially 30 to 600 parts by weight per 100 parts by weight of carbon dioxide. Where the amount of the volatile blowing agent based on carbon dioxide is outside the above range, the resulting prefoamed particles drastically deform and shrink, and have non-uniform particle size and heavy roughness of cells. The total amount of carbon dioxide and the volatile blowing agent is 5 to 30 parts by weight per 100 parts by weight of the polymer particles.

In the second embodiment as well, the impregnating, dispersing, heating and releasing steps are performed substantially simultaneously as in the first embodiment.

When carbon dioxide and the volatile blowing agent are, as aforesaid, conjointly used as blowing agents to be impregnated in polymer particles in producing prefoamed polymer particles according to the second embodiment of this invention, there are brought forth a synergistic effect of expanding effects given by carbon dioxide and the volatile blowing agent, and pefoamed particles having a higher expansion ratio are obtainable than in the case of conducting the expansion using carbon dioxide or the volatile blowing agent singly as the blowing agent. Besides, the pressure of the inside of the vessel should be high to obtain a highly foamed product in the first embodiment using carbon dioxide alone as the blowing agent, whereas prefoamed particles having a high expansion ratio can be very easily afforded even with the small amounts of the blowing agents (carbon dioxide and the volatile blowing agent) in the second embodiment of this invention. In either the first embodiment or the second embodiment, there is of course a merit that the temperature suited for expansion at the time of prefoaming is wide-ranging. Accordingly, it is possible to produce stably the prefoamed particles which are less irregular in expansion ratio and high in proportion of closed cells.

The prefoamed particles obtained by the present invention have usually an apparent expansion ratio of 5 to 50 in either embodiment. Moreover, the present invention can prevent an adverse effect of the blowing agent on the polymer particles owing to the swelling action, allowing the stable formation of prefoamed particles having less irregularity in expansion ratio. In addition, the prefoamed particles obtained by this invention have a high proportion of closed cells and excellent moldability.

When the prefoamed particles obtained by this invention are filled in a mold and heat-expanded using a heating medium such as steam, a foamed article conforming to the mold can be provided.

The following Examples and Comparative Examples illustrate the present invention more specifically.

EXAMPLES 1-3

Three hundred grams of polymer particles indicated in Table 1 were charged into an autoclave having a capacity of 2100 cc together with 1350 cc of water, carbon dioxide (dry ice) in an amount indicated in Table 1 and 1 g of finely divided aluminum oxide. With stirring, the mixture was heated to an expansion temperature indicated in Table 1 at a rate of 5° C./min and kept at this temperature for 60 minutes. While a pressure was applied with nitrogen held at 30 kg/cm$^2$, one end of the autoclave was opened and the resulting product was released to an open atmosphere at a discharge rate of 1 kg/min/mm$^2$ to afford foamed particles having an apparent expansion ratio indicated in Table 1. The resulting foamed particles were high in proportion of closed cells.

COMPARATIVE EXAMPLES 1-3

Prefoamed particles were obtained as in Examples 1-3 except using the blowing agent indicated in Table 1. In this case, butane was burnable with fear of burning in the prefoaming and therefore inconvenient to treat.

C./min. and kept for 60 minutes. While a pressure was applied with nitrogen held at 45 kg/cm², one end of the autoclave was opened, and the polymer particles and water were simultaneously released to an open atmosphere to obtain prefoamed particles having an apparent expansion ratio indicated in Table 2. The resulting prefoamed particles were closed-cellular and high in expansion ratio.

TABLE 1

| | Polymer particles | Blowing agent | | | | | Expansion temperature (°C.) | Apparent expansion ratio of prefoamed particles* |
|---|---|---|---|---|---|---|---|---|
| | | Type | Amount | Safety | Action to destroy an ozone layer | Cost | | |
| Example | | | | | | | | |
| 1 | Ethylene-propylene random copolymer (ethylene content: 3 wt. %) | Carbon dioxide | 30 g | Safe | No | Inexpensive | 144–145 | 23–24 |
| 2 | Cross-linked low-density polyethylene (gel content 52%) | Carbon dioxide | 44 g | Safe | No | Inexpensive | 125–126 | 12–14 |
| 3 | Cross-linked linear low-density polyethylene (gel content 30%) | Carbon dioxide | 44 g | Safe | No | Inexpensive | 143–146 | 14–17 |
| Comparative Example | | | | | | | | |
| 1 | Same as in Example 1 | Butane | 30 g | Dangerous | No | Somewhat inexpensive | 144–145 | 9–15 |
| 2 | Same as in Example 2 | Butane | 44 g | Dangerous | No | Somewhat inexpensive | 125–126 | 7–15 |
| 3 | Same as in Example 3 | Dichlorodifluoromethane | 44 g | Safe | Yes | Expensive | 143–146 | 6–16 |

*The maximum and minimum of values measured by sampling particles at every given time in the prefoaming.

TABLE 2

| | Polymer particles | Volatile impregnating aid | | Expansion temperature (°C.) | Apparent expansion ratio of prefoamed particles* |
|---|---|---|---|---|---|
| | | Type | Amount (g) | | |
| Example | | | | | |
| 4 | Cross-linked low-density polyethylene (gel content 52%) | Acetone | 50 | 130° C. | 17 |
| 5 | Cross-linked low-density polyethylene (gel content 52%) | Trichlorofluoromethane | 50 | 130° C. | 19 |
| 6 | Cross-linked low-density polyethylene (gel content 52%) | Heptane | 50 | 130° C. | 18 |
| 7 | Ethylene-propylene random copolymer (ethylene content: 3 wt. %) | Acetone | 50 | 145° C. | 27 |
| 8 | Ethylene-propylene random copolymer (ethylene content: 3 wt. %) | Heptane | 50 | 145° C. | 29 |

*See Table 1.

EXAMPLES 4-8

One thousand grams of polymer particles indicated in Table 2, 3000 g of water, 3 g of finely divided aluminum oxide and 100 g of carbon dioxide (dry ice) were charged into an autoclave having a capacity of 4950 cc together with a volatile impregnating aid indicated in Table 2. With stirring, the temperature was elevated to a given temperature indicated in Table 2 at a rate of 5°

EXAMPLES 9-16 AND COMPARATIVE EXAMPLES 4-6

One thousand grams of polymer particles indicated in Table 3 and 5 g of finely divided aluminum oxide were charged into an autoclave having a capacity of 5000 cc along with carbon dioxide (dry ice) and a volatile blowing agent. The amount of carbon dioxide and the type and amount of the volatile blowing agent are indicated in Table 3.

With stirring, the mixture was then heated to an expansion temperature indicated in Table 3 at a heating rate of 5° C./min, and maintained at the same temperature for 60 minutes. While a pressure was applied with nitrogen kept at 55 kg/cm$^2$, one end of the autoclave was opened and the polymer particles and water were simultaneously released to an open atmosphere at a discharge rate of 1000 g/min/mm$^2$ to expand the polymer particles. There resulted prefoamed particles. Compared with the prefoamed particles in Comparative Examples, the prefoamed particles in Examples were good ones which were, as indicated in Table 3, high in apparent expansion ratio, uniform in particle shape without shrinkage and deformation and free from roughness or uneveness of cells.

What is claimed is:

1. A process for producing prefoamed polymer particles, which comprises a step of impregnating carbon dioxide in polymer particles, a step of dispersing the polymer particles into a dispersion medium in a sealed vessel, a step of heating the polymer particles to a temperature higher than the softening point of said polymer particles, and a step of opening one end of said vessel and simultaneously releasing the polymer particles and dispersion medium from inside the vessel to an atmosphere held at a pressure lower than that of the vessel.

2. The process of claim 1 wherein 5 to 50 parts by weight of carbon dioxide per 100 parts by weight of the polymer particles is impregnated in the polymer particles.

3. A process for producing prefoamed polymer particles, which comprises a step of impregnating carbon dioxide and a volatile blowing agent in polymer particles, a step of dispersing the polymer particles into a dispersion medium in a sealed vessel, a step of heating the polymer particles to a temperature higher than the softening point of said polymer particles, and a step of opening one end of said vessel and simultaneously releasing the polymer particles and dispersion medium from inside the vessel to an atmosphere held at a pressure lower than that of the vessel.

4. The process of claim 3 wherein carbon dioxide and the volatile blowing agent in the total amount of 5 to 30 parts by weight per 100 parts by weight of the polymer particles are impregnated in the polymer particles.

5. The process of claim 3 wherein the volatile blowing agent is used in an amount of 20 to 800 parts by weight per 100 parts by weight of carbon dioxide.

6. The process of claim 1 or 3 wherein polymer particles made of a polyolefin resin are used.

TABLE 3

| | | Blowing agent | | | | Prefoamed particles | | |
|---|---|---|---|---|---|---|---|---|
| | Polymer particles | Amount of carbon dioxide (g) | Volatile blowing agent Type | Amount (g) | Carbon dioxide (g)/ volatile blowing agent (g) | Expansion temperature (°) | Apparent expansion ratio*1 | State of particles*2 | State of cells*3 |
| Example | | | | | | | | | |
| 9 | Cross-linked low-density polyethylene (gel content 52%) | 40 | Butane | 80 | 100/200 | 130–132 | 23–24 | Good | Good |
| 10 | Cross-linked low-density polyethylene (gel content 52%) | 60 | Butane | 60 | 100/100 | 130–132 | 25–26 | Good | Good |
| 11 | Cross-linked low-density polyethylene (gel content 52%) | 80 | Butane | 40 | 100/50 | 130–132 | 22–23 | Good | Good |
| 12 | Cross-linked linear low-density polyethylene (gel content 30%) | 40 | Dichlorodifluoromethane | 80 | 100/200 | 143–146 | 27–28 | Good | Good |
| 13 | Cross-linked linear low-density polyethylene (gel content 30%) | 60 | Dichlorodifluoromethane | 60 | 100/100 | 143–146 | 25–26 | Good | Good |
| 14 | Cross-linked linear low-density polyethylene (gel content 30%) | 80 | Dichlorodifluoromethane | 40 | 100/50 | 143–146 | 20–22 | Good | Good |
| 15 | Ethylene-propylene random copolymer (ethylene content 3 wt. %) | 50 | Butane | 70 | 100/140 | 144–145 | 32–33 | Good | Good |
| 16 | Ethylene-propylene random copolymer (ethylene content 3 wt. %) | 70 | Butane | 50 | 100/78 | 144–145 | 29–30 | Good | Good |
| Comparative Example | | | | | | | | | |
| 4 | Same as in Example 9 | 0 | Butane | 120 | 0/100 | 130–132 | 9–16 | Poor | Poor |
| 5 | Same as in Example 12 | 0 | Dichlorodifluoromethane | 120 | 0/100 | 143–146 | 11–17 | Brightly poor | Poor |
| 6 | Same as in Example 15 | 0 | Butane | 120 | 0/100 | 144–145 | 15–19 | Poor | Poor |

Notes:
*1See Table 1.
*2The state of particles was evaluated as follows by observing the condition of the spherical shape, presence or absence of shrinkage and particle size of prefoamed particles.
Particles free from deformation of the spherical shape and shrinkage and having a uniform particle size - Good
Particles containing small amounts of deformed and shrunk particles and having non-uniform particle size - Slightly poor
Particles containing very large amounts of deformed and shrunk particles and having non-uniform particle size - Poor
*3The state of cells was evaluated as follows by observing the cross section of prefoamed particles with a microscope.
Cells free from roughness and having uniform cell size - Good
Cells having slight roughness and somewhat non-uniform cell size - Slightly poor
Cells having heavy roughness and non-uniform cell size - Poor 7. The process of claim 1 or 3 wherein crystalline polymer particles are used and said particles are heated to a temperature in the range of from a temperature 10° C. lower than the melting point of said polymer to a temperature 50° C. higher than the melting point of said polymer.

8. The process of claim 1 or 3 wherein amorphous polymer particles are used and said particles are heated to a temperature in the range of from a temperature 10° C. higher than the softening point of said polymer to a temperature 70° C. higher than the softening point of said polymer.

9. The process of claim 1 or 3 wherein water, ethylene, glycol, glycerol, methanol or ethanol is used as the dispersion medium.

10. The process of claim 1 or 3 wherein the polymer particles and dispersion medium are released from inside a vessel held at 20 to 100 kg/cm$^2$ to an atmosphere held at atmospheric pressure.

* * * * *